(12) United States Patent
Furuhashi et al.

(10) Patent No.: US 6,697,065 B1
(45) Date of Patent: Feb. 24, 2004

(54) IMAGE PROCESSING METHOD AND DEVICE

(75) Inventors: Shinichi Furuhashi, Tokyo (JP); Toshihiro Nakane, Tokyo (JP)

(73) Assignee: Sega Enterprises, Ltd., Tokyo (JP)

( * ) Notice: Subject to any disclaimer, the term of this patent is extended or adjusted under 35 U.S.C. 154(b) by 0 days.

(21) Appl. No.: 09/576,040

(22) Filed: May 23, 2000

(30) Foreign Application Priority Data

May 25, 1999 (JP) .......................................... 11-145037

(51) Int. Cl.$^7$ ................................................ G06T 15/60

(52) U.S. Cl. ...................... 345/426; 345/582; 345/589; 345/592

(58) Field of Search ................................. 345/426, 582, 345/589, 592

(56) References Cited

U.S. PATENT DOCUMENTS 5,412,796 A * 5/1995 Olive
6,064,392 A * 5/2000 Rohner
6,377,229 B1 * 4/2002 Sullivan

FOREIGN PATENT DOCUMENTS

JP 11-75320 3/1999

* cited by examiner

Primary Examiner—Mark Zimmerman
Assistant Examiner—Kimbinh T. Nguyen
(74) Attorney, Agent, or Firm—Dickstein Shapiro Morin & Oshinsky LLP

(57) ABSTRACT

An image processing method is for fogging an object 12 in a three-dimensional space, which is observed at a view point. A fog density of the object observed at the view point is computed based on a distance d between a fog base plane 10 set in the three-dimensional space and the object 12. The image processing method can provide realistic images.

19 Claims, 9 Drawing Sheets

IMAGE PROCESSING METHOD AND DEVICE

BACKGROUND OF THE INVENTION

The present invention relates to an image processing method and device, more specifically to an image processing method and device for generating the fog effect.

In the field of the computer graphics the fog effect generating art for generating in images fog and mist of vapor, and fog of, e.g., smoke, dust, etc., is noted for the purpose of providing more realistic images.

The conventional fog effect generating technique will be explained. In the conventional fog effect generating technique, when fog is generated, a distance between a view point and a point on a polygon is computed, and based on the distance, a fog density at the point is set. For example, when a distance between a view point and a point on the polygon is large, a fog density corresponding to the point on the polygon is made higher, and when a distance between a view point and a point on a polygon is small, a fog density corresponding to the point on the polygon is made low.

However, according to such conventional fog effect generating technique, higher fog densities are provided as a distance from a view point increases. Accordingly, it is impossible to provide realistic images in which, for example, fog is dense near the ground and is thinner upward.

Furthermore, according to the conventional fog effect generating technique, when varying a fog density, the variation of the fog density is uniform. It is impossible to provide realistic images in which fog is hazy.

SUMMARY OF THE INVENTION

An object of the present invention is to provide an image processing method and device which can provide realistic images.

The above-described object is achieved by an image processing method for fogging an object in a three-dimensional space, which is observed at a view point, a fog density of the object observed at the view point being computed based on a distance between a fog base plane set in the three-dimensional space and the object.

Fog densities are set corresponding to densities between a fog base plane and an object, whereby realistic images that dense fog hangs over the ground can be provided.

The above-described object is achieved by an image processing method for fogging an object in a three-dimensional space, which is observed at a view point, a fog density of the object observed at the view point being computed based on a distance between a fog base plane set in the three-dimensional space and the object and on a distance between the view point and the object.

Even when objects are spaced equidistantly from a fog base plane, a lower fog density is given for that of the objects which is nearer of the objects, and a higher fog density is given to that of the objects which is remote. Realistic images can be provided.

In the above-described image processing method it is preferable that for an object belonging to one side of the fog base plane, the fog density thereof is computed by a first function and, for an object belonging to the other side of the fog base plane, the fog density thereof is computed by a second function which is different from the first function. More realistic images can be provided.

In the above-described image processing method it is preferable that the fog density is varied at random to perform haze processing. Haze states can be expressed. Realistic images can be provided.

In the above-described image processing method it is preferable that a plurality of the fog base planes are provided, and the fog densities given with respect to said plurality of the fog base planes are synthesized with each other. More realistic images can be provided.

The above-described object is achieved by an image processing device for fogging an object in a three-dimensional space, which is observed at a view point, comprising fog density computing means for computing a fog density of the object observed at the view point, based on a distance between a fog base plane set in the three-dimensional space and the object.

Fog densities are set corresponding to densities between a fog base plane and an object, whereby realistic images that dense fog hangs over the ground can be provided.

The above-described object is achieved by an image processing device for fogging an object in a three-dimensional space, which is observed at a view point, comprising fog density computing means for computing a fog density of the object observed at the view point, based on a distance between a fog base plane set in the three-dimensional space and the object and on a distance between the view point and the object.

Even when objects are spaced equidistantly from a fog base plane, a lower fog density is given for that of the objects which is nearer of the objects, and a higher fog density is given to that of the objects which is remote. Realistic images can be provided.

In the above-described image processing device it is preferable that the fog density computing means, for an object belonging to one side of the fog base plane, computes the fog density thereof by a first function and, for an object belonging to the other side of the fog base plane, computes the fog density thereof by a second function which is different form the first function. More realistic images can be provided.

In the above-described image processing device it is preferable that haze processing unit for varying the fog density at random to perform haze processing. Hazy states can be expressed. Realistic images can be provided.

In the above-described image processing device it is preferable that a plurality of the fog base planes are provided, and the fog density computing means synthesizes the fog densities given with respect to said plurality of fog base planes. More realistic images can be provided.

DETAILED DESCRIPTION OF THE INVENTION

A First Embodiment

Figure 1:
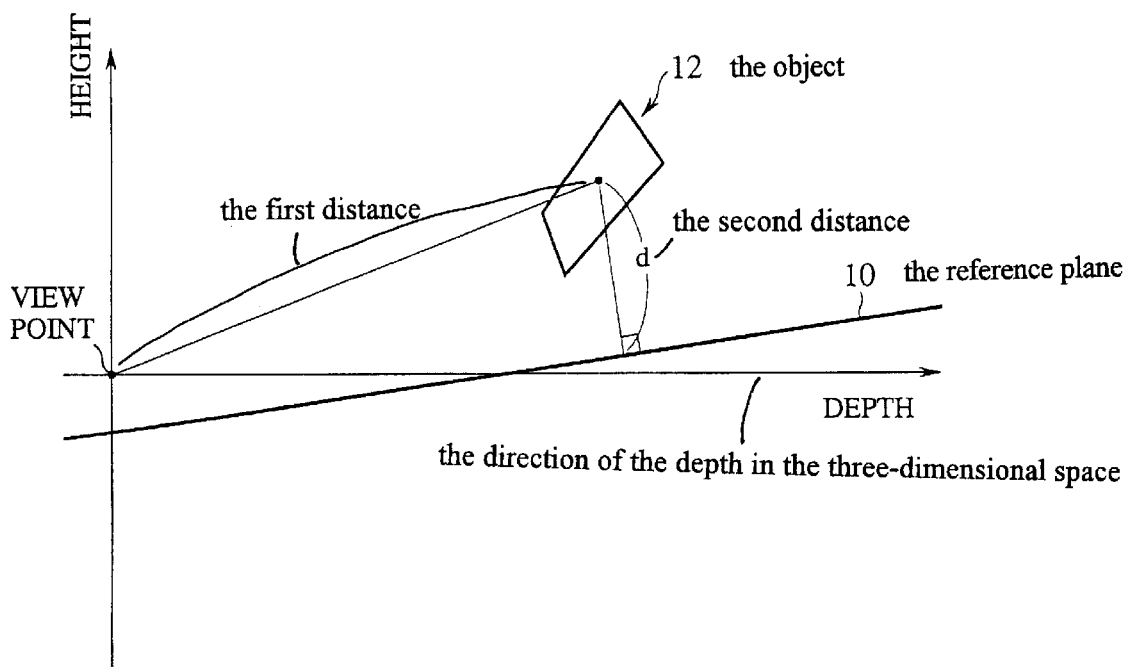
FIG. 1 is a conceptual view showing a principle of the image processing method according to a first embodiment of the present invention.
Figure 2:
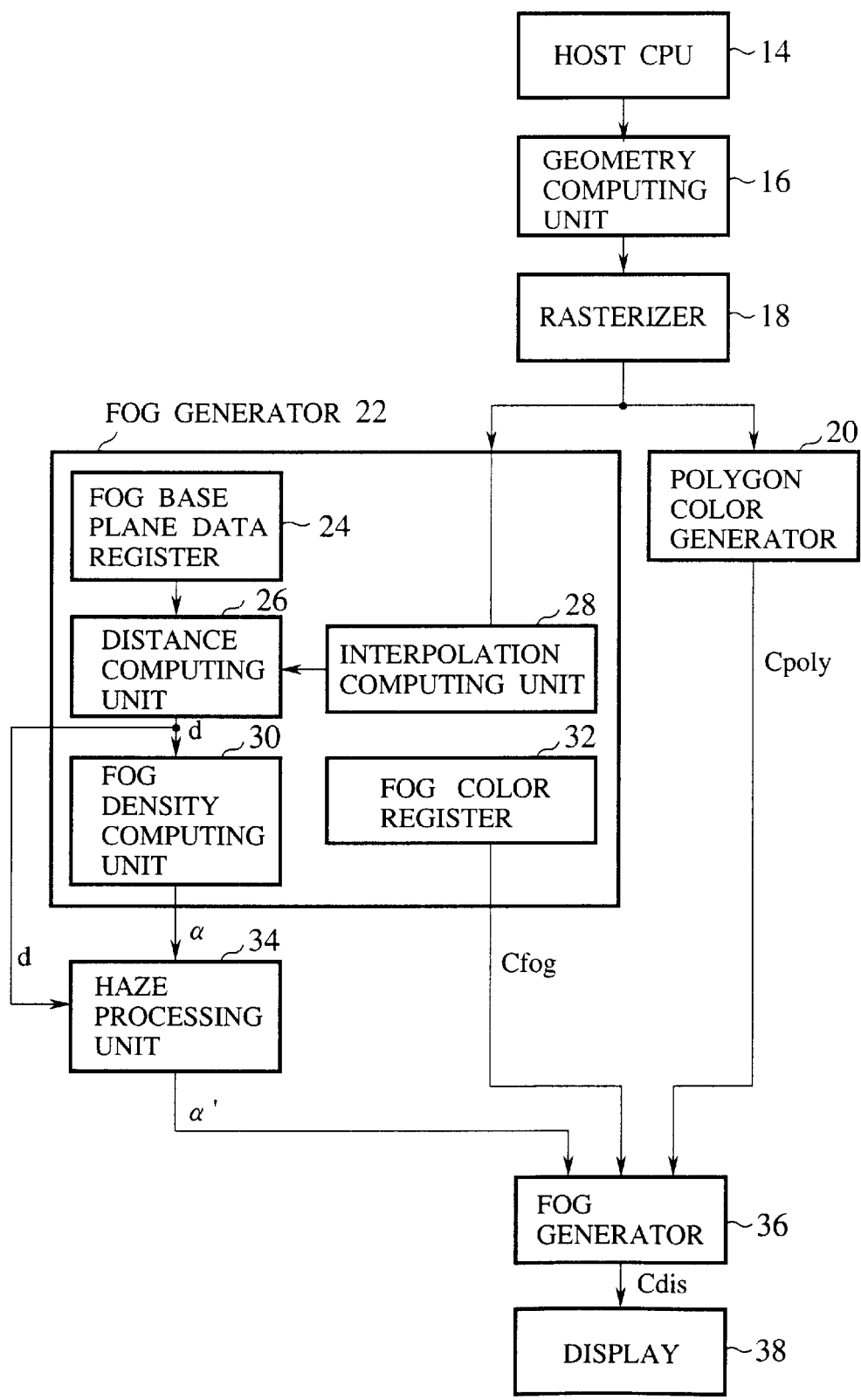
FIG. 2 is a block diagram of the image processing device according to the first embodiment of the present invention.
Figure 3:
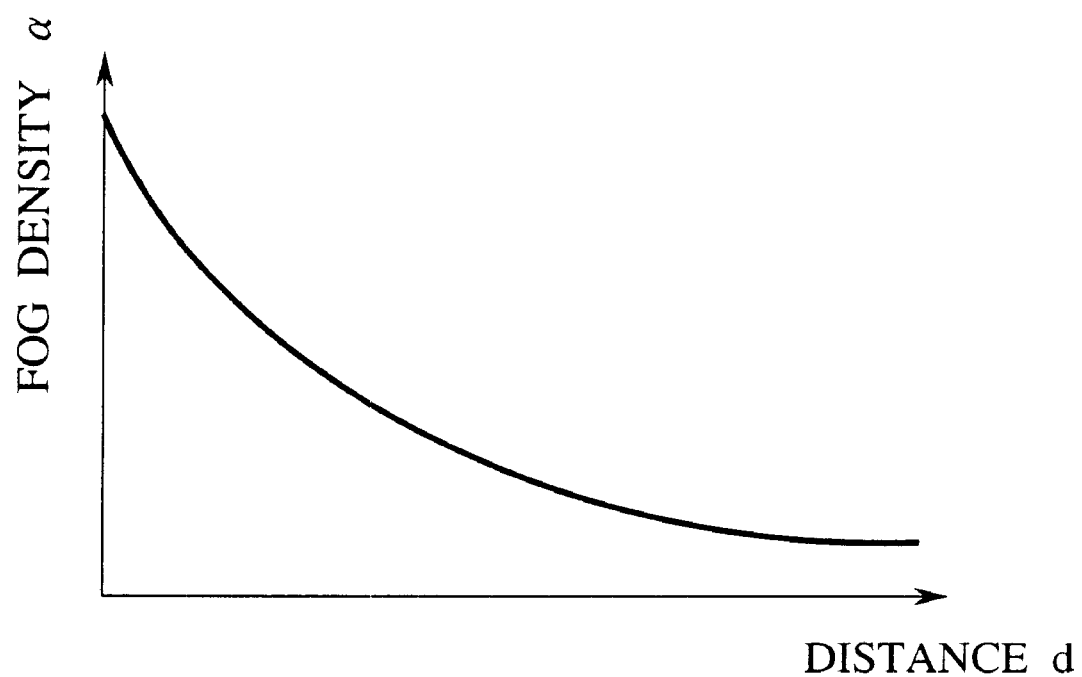
FIG. 3 is a graph of relationships between a distance d and a fog density $\alpha$.
Figure 4:
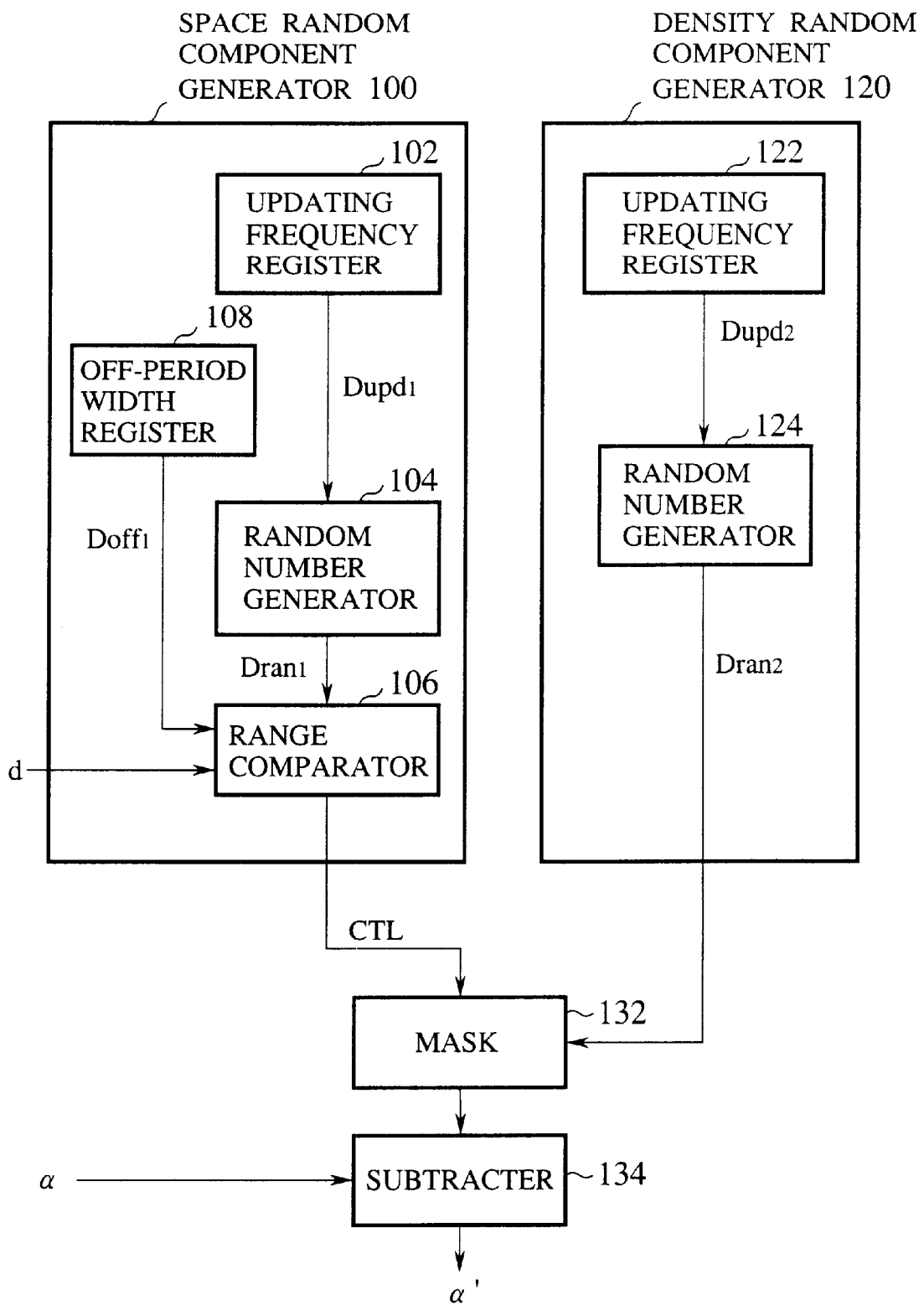
FIG. 4 is a block diagram of a haze processing unit.
Figure 5:
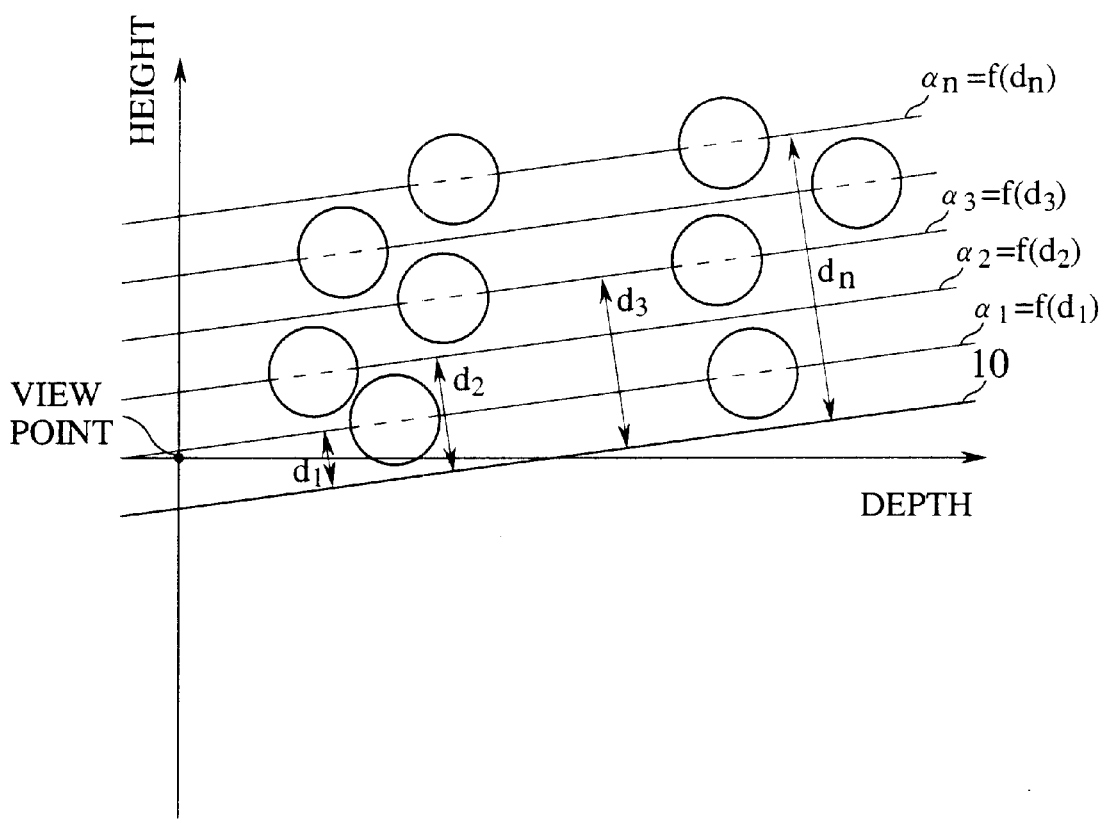
FIG. 5 is a graph showing a principle of a space random component generator.
Figure 6:
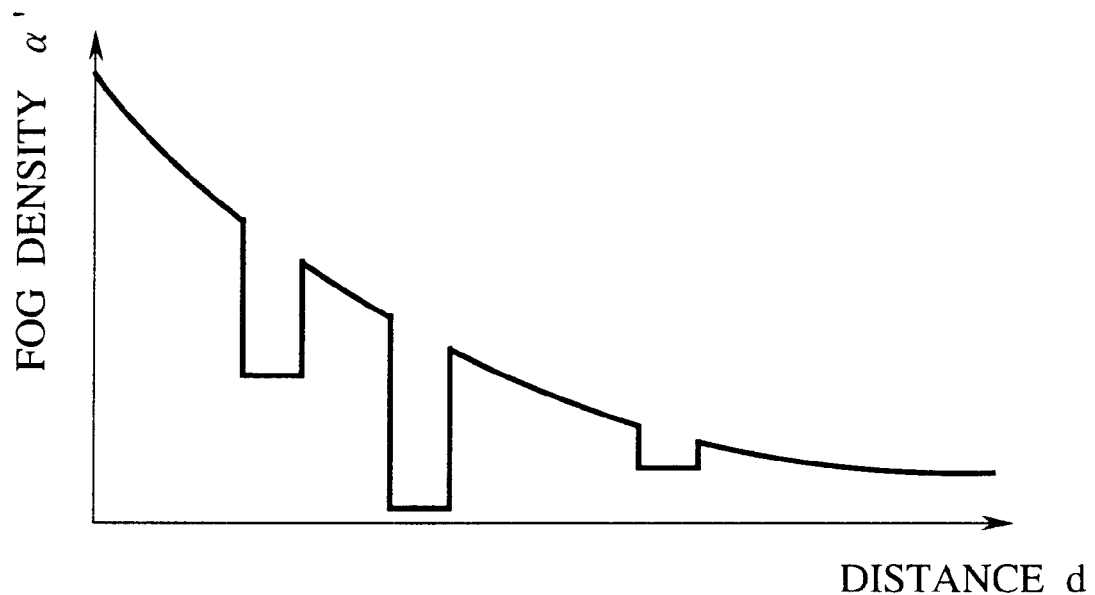
FIG. 6 is a graph of fog densities subjected to the haze processing.

The image processing method and device according to a first embodiment of the present invention will be explained with reference to FIGS. 1 to 6. FIG. 1 is a conceptual view showing the principle of the image processing method according to the present embodiment. FIG. 2 is a block diagram of the image processing device according to the present embodiment. FIG. 3 is a graph showing relationships between distances and fog densities. FIG. 4 is a block diagram of a haze processing unit. FIG. 5 is a graph showing a principle of a space random component generator. FIG. 6 is a graph of fog densities after the haze processing has been performed.

As shown in FIG. 1, a fog base plane 10 is given in a three-dimensional space. In FIG. 1, the vertical axis indicates the direction of height in the three-dimensional space, the horizontal axis indicates the direction of depth, and the direction perpendicular to the drawing sheet indicates the left-to-right direction in the three-dimensional space.

A polygon 12, for example, is positioned on the fog base plane 10. A plurality of polygons are present in the actual image processing, but for simplicity of the explanation, one polygon alone is shown in FIG. 1.

The image processing device according to the present embodiment is characterized mainly in that a distance d between the fog base plane 10 and a point on the polygon 12 is computed, and a fog density is set corresponding to the distance d. That is, in the conventional image processing device a fog density is set corresponding to a distance between a view point and a point on a polygon, whereby it is impossible to express a state that fog hangs over the surface of the ground. In contrast to this, in the present embodiment, a fog density can be set corresponding to a distance between the fog base plane 10 and a point on the polygon 12, whereby it is possible to express a state that fog hangs over the surface of the ground. The present embodiment can provide realistic images.

A function exemplified in FIG. 3 which makes a fog density α less dense as a distance d from the fog base plane 10 is used, whereby an image in which fog is dense near the ground and becomes less dense away from the ground can be provided.

Next, the image processing method and device according to the present embodiment will be explained with reference to FIG. 2.

As shown in FIG. 2, a host CPU 14 has a function of generally controlling the image processing device according to the present embodiment. The host CPU 12 inputs to a geometric computing unit 16 data of an object to be displayed on a screen.

The geometric computing unit 16 has a function of converting the data of the object to data of the polygon. Specifically, the geometric computing unit 16 gives three-dimensional coordinates of the vertices of the polygon so as to arrange the polygon on a three-dimensional view point coordinate system. Data of three-dimensional coordinates of the vertices of the polygon given by the operation are inputted to a rasterizer 18.

The rasterizer 18 has a function of rasterizing the three-dimensional coordinates of the polygon to two-dimensional coordinates so as to display the object on the two-dimensional screen. Specifically, the object is broken into a plurality of lines to be defined by two-dimensional coordinates. Thus, the vertices of the polygon are defined by the two-dimensional coordinates.

The two-dimensional coordinate data given by the rasterizer 18 are inputted to an interpolation computing unit 28 incorporated in a fog generator 22. The fog generator 22 includes, in addition to the interpolation computing unit 28, a fog base plane data register 24, a distance computing unit 26, a fog density computing unit 30 and a fog color register 32.

The interpolation computing unit 28 has a function of interpolating two-dimensional coordinates inputted by the rasterizer 18 to thereby give three-dimensional coordinates (x,y,z) corresponding to respective picture elements on the screen. The three-dimensional coordinates (x,y,z) are inputted to the distance computing unit 26.

The fog base plane data register 24 stores data of the fog base plane 10. When the fog base plane 10 is, e.g., flat, the fog base plane 10 is expressed by the formula $$lx+my+nz=p$$

(l, m, n and p are arbitrary actual numbers). In this case, the fog base plane data register 24 stores data, such as l, m, n and p, etc. The data stored by the fog base plane data register 24 are inputted to the distance computing unit 26.

The distance computing unit 26 has a function of giving, corresponding to one picture element on the display screen, a distance between the fog base plane 10 and a point on the polygon. When the fog base plane 10 is flat, a distance d between the fog base plane 10 and the point on the polygon 12 is given by $$d=|lx+my+nz-p|/(l^2+m^2+n^2)^{0.5}.$$

The thus given distance d is inputted to the fog density computing unit 30. The fog density computing unit 30 is for giving a fog density α at the point on the polygon. The fog density computing unit 30 gives a fog density α by using an arbitrary function α=f(d). To express a state that fog hangs over the surface of the ground, for example, the function is used as shown in FIG. 3 so that a fog density α decreases as a distance d increases. The thus given fog density α is inputted to the haze processing unit 34. A distance d is given by the distance computing unit 26 is inputted to the haze processing unit 34.

The haze processing unit 34 is for expressing a hazy state which will be described later. The data of the fog density α' given by the haze processing unit 34 is inputted to the fog synthesizer 36.

The fog color register 32 is for storing a fog color $C_{fog}$. The data of the fog color $C_{fog}$ stored by the fog color register 32 is inputted to the fog synthesizer 36.

The data of the two-dimensional coordinates given by the rasterizer 18 is inputted to the polygon color generator 20 as well as the fog generator 22. The polygon color generator 20 has a function of generating a color of the point on the polygon 12, i.e., a polygon color $C_{poly}$. The polygon color $C_{poly}$ is given corresponding to one picture element on the screen. The data of the polygon color $C_{poly}$ given by the polygon color generator 20 is inputted to the fog synthesizer 36.

The fog synthesizer 36 has a function of synthesizing the data of the fog density α', the fog color $C_{fog}$ and the polygon color poly to give data of a display color $C_{dis}$ at the point on the polygon 12. The data of the display color $C_{dis}$ is given corresponding to one picture element on the screen. The display color $C_{dis}$ at the point on the polygon 12 is given by $$C_{dis}=(1-\alpha')\cdot C_{poly}+\alpha'\cdot C_{fog}.$$

The thus given display color $C_{dis}$ on the polygon 12 is outputted to the display device 38 to be displayed on the screen of the display device 38.

Then, the haze processing device 34 will be detailed with reference to FIGS. 4 to 6. The haze processing device 34 is for expressing hazy states, and includes a space random component generator 100 and a density random component generator 120.

The space random component generator 100 has a function of generating a space component for expressing a hazy state. An updating frequency register 102 stores updating frequency data $D_{upd1}$ which indicates an updating frequency of a space random component. The updating frequency data $D_{upd1}$ has a value which is integer times one updating time (1 int). The updating frequency data $D_{upd1}$ stored by the updating frequency register 102 is inputted to a random number generator 104. The random number generator 104 generates random number data $D_{ran1}$ at a frequency based on the updating frequency data $D_{upd1}$. Random number data $D_{ran1}$ generated by the random number generator 104 is inputted to a range comparator 106. An off-period width register 108 is for setting a space width in which a fog density changes. The off-period width register 108 stores off-period width data $D_{off1}$. The off-period width data $D_{off1}$ contains a sectional distance component, and an off-period appearing frequency component in plane of a prescribed distance. It is preferable that a value of the off-period width data $D_{off1}$ is suitably set so that a hazy state is visible to the human eye on the screen.

A distance d, random number data $D_{ran1}$ and an off-period width data $D_{off1}$ are inputted to the range comparator 106. The range comparator 106 compares the random data Dran1 with the distance d. When both agrees with each other, a control signal CTL is turned off in accordance with a value of the off-period width data $D_{off1}$. The control signal CTL is inputted to a mask 132. The control signal CTL is normally ON, and is turned OFF in accordance with a value of the off-period width data $D_{off1}$ when values of the random data $D_{ran1}$ and of the distance d agree with each other.

A state of space random components generated by such space random component generator 100 will be explained with reference to FIG. 5. As indicated by the solid lines in FIG. 5, a fog density α is determined based on a distance d from the fog base plane 10. A fog density α in a region spaced by a distance $d_n$ from the fog from the fog base plane 10 is $α_n$. Here, when the control signal CTL of the range comparator 106 of the space random component generator 100 is turned OFF, fog densities change in the regions circled in FIG. 5.

The density random component generator 120 includes a updating frequency register 122 which stores a frequency of changing a fog density. Updating frequency data $D_{upd2}$ stored by the updating frequency register 122 is inputted to a random number generator 124. The updating frequency data $D_{upd2}$ has a value which is integer times one updating period on the screen. The random number generator 124 outputs random number data $D_{ran2}$ to the mask 132 at a frequency based on the updating frequency data $D_{upd2}$.

The random number data Dran2 inputted to the mask 132 is outputted to a subtracter 134 only when the control signal CTL is OFF. The subtracter 134 subtracts the random number data $D_{ran2}$ from the fog density α to output a fog density α'. Thus, as shown in FIG. 6, a fog density α' changes at random corresponding to a distance d.

As described above, according to the present embodiment, a fog density is set corresponding to a distance between the fog base plane and a polygon, whereby images in which dense fog realistically hangs over the surface of the ground can be provided.

According to the present embodiment, the haze processing for changing a fog density at random is performed, whereby hazy states can be expressed, and realistic images can be provided.

(A Modification)

Figure 7:
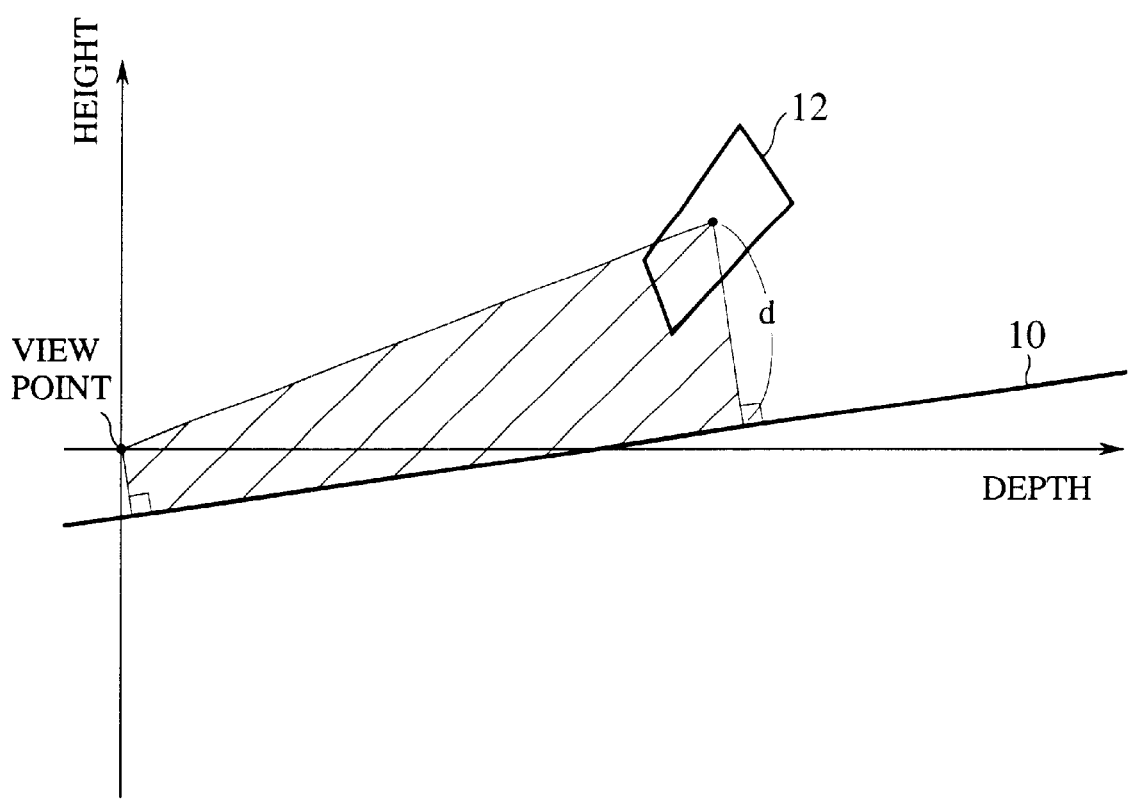
FIG. 7 is a conceptual view of a principle of the image processing method according to a modification of the first embodiment of the present invention.

Then, a modification of the image processing method according to the present embodiment will be explained with reference to FIG. 7. FIG. 7 is a conceptual view explaining a principle of the image processing method according to the present embodiment.

The image processing method according to the present modification is characterized in that a fog density α at a point on a polygon 12 is given based on a line component interconnecting a view point and the point on the polygon 12, and an integrated value given with respect to the fog base plane 10.

Accordingly, higher fog densities are given to polygons at farther positions, and lower fog densities are given to polygons at nearer positions.

Thus, according to the present modification, even when objects are spaced from the fog base plane by the same distance, that of the objects which is nearer has a lower fog density, and that of the objects which is farther has a higher fog density. The present modification can provide realistic images.

A Second Embodiment

Figure 8A:
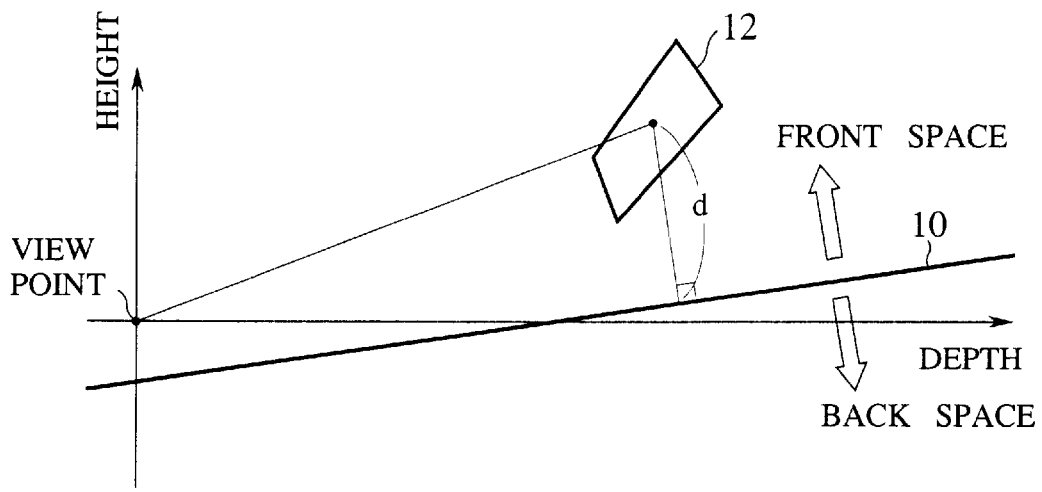
FIGS. 8A–8C are conceptual views showing a principle of the image processing method according to a second embodiment of the present invention.

The image processing method according to a second embodiment of the present invention will be explained with reference to FIGS. 8 and 9. FIG. 8 is conceptual views explaining a principle of the image processing method according to the present embodiment. FIG. 9 is views exemplifying image displays by the image processing method according to the present embodiment. The same members of the image processing method and device according to the present embodiment as those of the image processing method and device according to the first embodiment shown in FIGS. 1 to 7 are represented by the same reference numbers not to repeat or to simplify their explanation.

The image processing method according to the present embodiment is characterized in that a space above a fog base plane 10 is a front space, and a space below the fog base plane 10 is a back space, and different fog densities α are given as functions and a constant respectively for the front space and the back space.

Figure 8B:
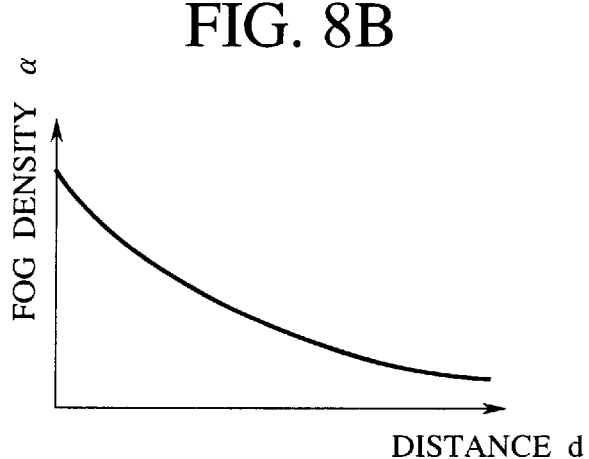
Figure 8C:
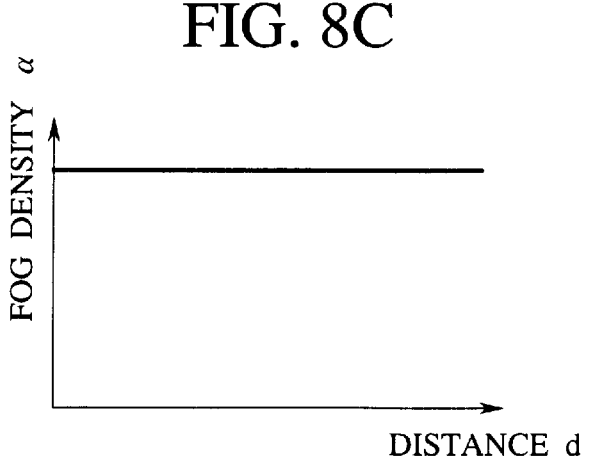

In the front space, for example, fog densities α are given as functions α=f(d), and fog densities α as exemplified in FIG. 8B are given. As in the first embodiment, the haze processing is performed, and fog densities α' are used, whereby more realistic images can be provided. On the other hand, in the back space, for example, a fog density α is given as a constant, and a fog density α as exemplified in FIG. 8C is given.

Thus, functions and a constant are used respectively for the front space and the back space which are divided with respect to the fog base plane 10 to determine fog densities, whereby more realistic images can be provided.

Examples of images provided by the image processing method according to the present embodiment will be explained with reference to FIG. 9.

Figure 9A:
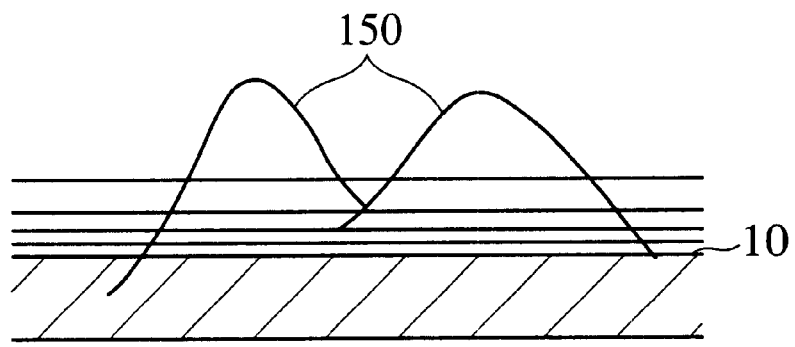
FIGS. 9A and 9B are views of images displayed on the screen of the second embodiment of the present invention.

FIG. 9A shows a state that a sea of clouds is on the foot of mountains 150, and fog hangs above the cloud sea. The fog base plane 10 is set at the foot of the mountains 160. The front space is above the fog base plane 10, and functions as shown in FIG. 8B are used. Accordingly, fog becomes less dense toward the sky from the fog base plane 10. On the other hand, the back space is below the fog base plane 10, and a constant as shown in FIG. 8C is used. Accordingly, in FIG. 9A, a fog density is constant in the diagonal line portion, and a sea of clouds is expressed.

Figure 9B:
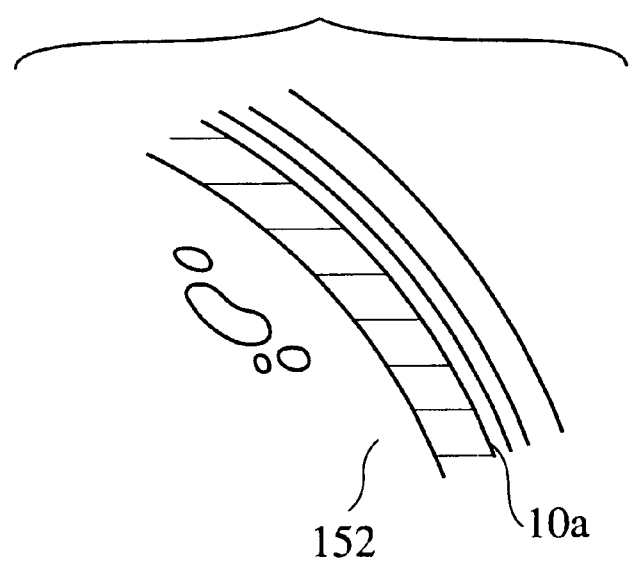

FIG. 9B expresses the earth 152. Because the earth 152 is round, a fog base plane 10a is curved. The outside of the fog base plane 10a is the front space, and the inside of the fog base plane 10a is the back space. In the front space functions as shown in FIG. 8B are used, and a fog density α becomes less dense away from the earth. On the other hand, in the back space inside of the fog base plane 10, a constant is used as a fog density α. The fog density α is constant inside of the fog base plane, i.e., in the back space. Accordingly, according to the present embodiment, a state that clouds surround the earth and become less dense gradually away from the earth can be expressed.

As described above, according to the present embodiment, functions and a constant are used respectively for the front space and the back space divided with respect to a fog base plane so as to determine fog densities, whereby more realistic images can be provided.

The present invention is not limited to the above-described embodiments and covers other various modifications.

For example, in the first and the second embodiments, only one fog base plane is provided, but a plurality of fog base planes may be provided. In this case, a fog density is given synthesizing fog densities with respect to the respective fog base planes. In a case, for example, that a flat fog base plane and a curved fog base plane are provided, a state that fog resides in the cavity can be expressed. In a case that a fog base plane opposed to a ground surface, and a fog base plane opposed to the screen are provided, different fog densities corresponding to distances from the ground surfaces and depths can be provided.

In the first and the second embodiments, fog, haze, etc. are used, but the present invention is not limited to fog and clouds. The present invention is applicable to all things, such as steam, haze, dust, tornadoes, smoke, etc.

In a case that a fog base plane is a curved plane, it is possible that the curved plane is divided into a plurality of flat planes to be approximated, and distances from the flat planes are used.

In the first and the second embodiments, fog densities of polygons are set, but the present invention is applicable to setting fog densities of all objects.

What is claimed is:

1. An image processing method for fogging an object set in a three-dimensional space at a first distance from a view point, said method comprising the steps of:

computing a fog density of the object being observed at the view point as a function of a second distance of said object from a reference plane, wherein said reference plane extends generally in the direction of the depth in the three-dimensional space; and applying the computed fog density to the object.

2. An image processing method for fogging an object set in a three-dimensional space at a first distance from a view point, said method comprising the steps of:

computing a fog density of the object being observed at the view point as a function of said first distance and a second distance of said object from a reference plane, wherein said reference plane extends generally in the direction of the depth in the three-dimensional space; and applying the computed fog density to the object.

3. An image processing method according to claim 1, wherein the fog density at one side of said reference plane is computed by a first function and the fog density at the other side of said reference plane is computed by a second function which is different from the first function.

4. An image processing method according to claim 2, wherein the fog density at one side of said reference plane is computed by a first function and the fog density at the other side of said reference plane is computed by a second function which is different from the first function.

5. An image processing method according to claim 1, wherein the fog density is varied at random along a direction normal to said reference plane to perform haze processing.

6. An image processing method according to claim 2, wherein the fog density is varied at random along a direction normal to said reference plane to perform haze processing.

7. An image processing method according to claim 1, wherein a plurality of the reference planes are provided, and the fog densities given with respect to said plurality of the reference planes are synthesized with each other.

8. An image processing method according to claim 2, wherein a plurality of the reference planes are provided, and the fog densities given with respect to said plurality of the reference planes are synthesized with each other.

9. An image processing device for fogging an object set in a three-dimensional space at a first distance from a view point, comprising fog density computing means for computing a fog density of the object observed at the view point as a function of a second distance of said object from a reference plane, wherein said reference plane extends generally in the direction of the depth in the three-dimensional space.

10. An image processing device for fogging an object set in a three-dimensional space at a first distance from a view point, comprising fog density computing means for computing a fog density of the object observed at the view point as a function of said first distance and a second distance from a reference plane, wherein said reference plane extends generally in the direction of the depth in the three-dimensional space.

11. An image processing device according to claim 9, wherein the fog density computing means computes the fog density at one side of said reference plane by a first function and computes the fog density at the other side of said reference plane by a second function which is different from the first function.

12. An image processing device according to claim 10, wherein the fog density computing means computes the fog density at one side of said reference plane by a first function and computes the fog density at the other side of said reference plane by a second function which is different from the first function.

13. An image processing device according to claim 9, further comprising a haze processing unit for varying the fog density at random along a direction normal to said reference plane to perform haze processing.

14. An image processing device according to claim 10, further comprising a haze processing unit for varying the fog density at random along a direction normal to said reference plane to perform haze processing.

15. An image processing device according to claim 9, wherein a plurality of the reference planes are provided, and the fog density computing means synthesizes the fog densities given with respect to said plurality of reference planes.

16. An image processing device according to claim 10, wherein a plurality of the reference planes are provided, and the fog density computing means synthesizes the fog densities given with respect to said plurality of reference planes.

17. An image processing method for displaying a scene with a ground and a fogged object, comprising the steps of:

setting data for an object to be displayed in a three-dimensional space, said object being set at a first distance from a view point;

setting a reference point between a point on said object and the ground in the three-dimensional space;

computing a fog density in accordance with a function of said first distance and a second distance of the point on said object from said reference point so as to effect a decrease in fog density toward the point on said object from the reference point; and applying the computed fog density to the data for the object.

18. An image processing method according to claim 17, wherein said reference point is set on a reference plane which extends generally in the direction of the depth in the three-dimensional space.

19. An image processing method according to claim 17, wherein a fog density is set constant between the reference point and the ground.

* * * * *